United States Patent Office 2,816,101
Patented Dec. 10, 1957

2,816,101

CHROME CONTAINING MONOAZO DYESTUFFS

Kurt Breig, Koln, and Eugen Glietenberg and Ludwig Nüssler, Leverkusen, Germany, assignors to Farbenfabriken Bayer Aktiengesellschaft, Leverkusen, Germany, a corporation of Germany No Drawing. Application April 14, 1954,
Serial No. 423,248

Claims priority, application Germany April 25, 1953

6 Claims. (Cl. 260—147)

The present invention relates to new chrome containing monoazo dyestuffs and to a process of making the same; more particularly it relates to chrome complex compounds of monoazo dyestuffs being free from sulfonic acid groups and corresponding to the general formula

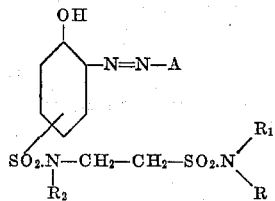

wherein A stands for a coupling component being coupled in o-position to an hydroxy group, R and $R_1$ stand for alkyl, substituted alkyl, or hydrogen, and $R_2$ stands for alkyl or substituted alkyl.

The new chrome containing monoazo dyestuffs free from sulfonic acid groups can be obtained by coupling diazotized 1-amino-2-hydroxybenzene-sulfamides of the formula

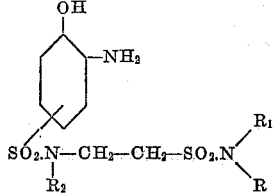

wherein R, $R_1$ and $R_2$ have the same meaning as above, with a coupling component coupling in o-position to a hydroxy group and being free from sulfonic acid groups. Suitable coupling compounds are e. g. 1-phenyl-3-methyl-5-pyrazolone, 1-(3'-nitro-phenyl)-3-methyl-5-pyrazolone, 1-(4'-nitro-phenyl)-3-methyl-5-pyrazolone, 1-(2'-chlorophenyl)-3-methyl-5-pyrazolone, 1-(2',5'-dichlorophenyl)-3-methyl-5-pyrazolone, 2-hydroxynaphthalene, 6-bromo-2-hydroxynaphthalene, 1-acetylamino-7-hydroxy-naphthalene, 3-hydroxydiphenylene oxide, 2-hydroxycarbazole.

The 1-amino-2-hydroxybenzene sulfoalkylaminoethane-sulfamides used as diazo components are obtainable by condensing 1-chloro-2-nitrobenzene sulfochlorides with an alkyl taurine, converting the condensation products into the sulfochloride and then into the sulfamide, and finally saponifying the chlorine and reducing the nitro group to the amino group.

The following examples illustrate the invention without, however, limiting it thereto:

Example 1

11.2 grams of 1-amino-2-hydroxybenzene-5-sulfomethylamino-ethane sulfamide are dissolved in 150 cc. of water and 10 cc. of hydrochloric acid and diazotized with a 10 percent sodium nitrite solution at 0–5° C. After a short time the diazonium compound precipitates as a crystalline yellow deposit. The acid suspension of it is rendered weakly acid by adding sodium bicarbonate and then slowly poured into a solution of 8 grams of 1-acetylamino-7-hydroxynaphthalene, 1.6 grams of solid sodium hydroxide, 4 grams of sodium carbonate and 150 cc. of water, cooled with ice. After stirring for one hour coupling is finished; the dark blue dyestuff solution shows a pH-value of 9.4. After stirring over night at room temperature the solution is adjusted to pH 8 by adding some diluted hydrochloric acid, whereby the dyestuff precipitates. The dyestuff paste obtained after filtering is heated with 90 cc. of water and 10 cc. of caustic soda solution (36° Bé.) to 75–80° C., whereby the dyestuff dissolves. At this temperature 125 cc. of a chroming solution containing 42.6 grams of potassium bichromate and 78 grams of glucose per litre is run in. Thereafter the solution is stirred for 20 minutes at 80° C. After cooling the dyestuff solution to 40° C. it is adjusted to pH 8.5 by adding some diluted hydrochloric acid, whereby the chromed dyestuff precipitates. The black powder thus obtained is the chrome complex of the monoazo dyestuff of the formula

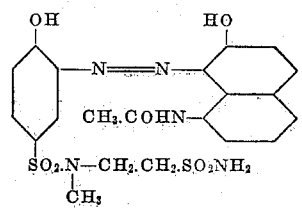

which dissolves well in hot water and dyes wool from neutral as well as weakly acid bath black-blue shades of good fastness to washing and very good fastness to light.

Example 2

11.2 grams of 1-amino-2-hydroxybenzene-5-sulfomethylamino-ethane sulfamide are diazotized as described in Example 1. The suspension of the diazo compound, neutralized with sodium bicarbonate, is allowed to slowly run into a solution of 6.95 grams of 1-phenyl-3-methyl-5-pyrazolone, 1.6 grams of solid sodium hydroxide, 4 grams of sodium carbonate and 200 cc. of water, cooled with ice. The coupling mixture is stirred over night at pH 8. The dyestuff precipitates without addition of sodium chloride; after filtering 150 cc. of a solution of ammonium chrome-salicylate (corresponding to 1.52 grams of $Cr_2O_3$) is added and the mixture is heated to the boil for 2 hours. To the hot solution 12 percent of sodium chloride are added. On cooling the chromed dyestuff precipitates. It is the chrome complex of the monoazo dyestuff of the formula

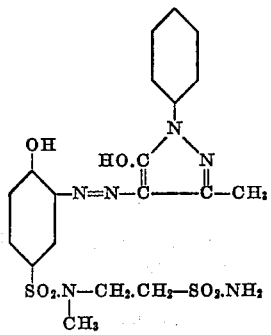

and dyes wool from neutral as well as weakly acid bath reddish orange shades of very good fastness to light as well as of good levelling power and good fastness to washing.

*Example 3*

11.2 grams of 1-amino-2-hydroxybenzene-5-sulfomethylamino-ethane sulfamide are diazotized as described in Example 1 and coupled with a solution of 7.3 grams of 3-hydroxy-diphenyleneoxide, 1.6 grams of solid sodium hydroxide and 4 grams of sodium carbonate in 200 cc. of water. After stirring overnight the solution is adjusted to pH 9 by adding some diluted hydrochloric acid, and the precipitated dyestuff is filtered by suction. The chromed dyestuff obtained according to one of the methods described in the foregoing examples represents a dark brown powder which dissolves in hot water with a brown color and dyes wool from neutral or weakly acid bath somewhat violetish brown shades of very good fastness to light and washing. The dyestuff is the chrome complex of the monoazo dyestuff of the formula

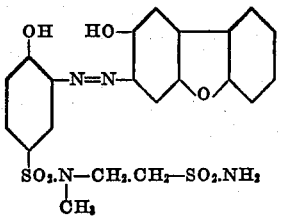

*Example 4*

11.7 grams of 1-amino-2-hydroxybenzene-5-sulfomethylyamino-ethane sulfomethylamide are diazotized as described in the preceding examples. By coupling with a solution of 8 grams of 1-acetylamino-7-hydroxynaphthalene, 1.6 grams of solid sodium hydroxide, 4 grams of sodium carbonate in 150 cc. of water a dyestuff is obtained which, after chroming, represents a black powder. It dyes wool from weakly acid bath black shades of very good fastness to light and washing. The dyestuff is the chrome complex of the monoazo dyestuffs of the formula

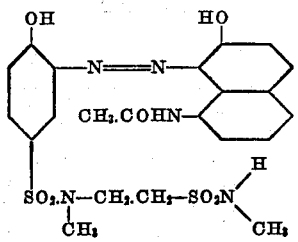

Dyestuffs of very similar properties are obtained, if in the above examples in the diazo components used one or both hydrogen atoms of the terminal amide group are replaced by methyl, ethyl or hydroxyethyl i. e. if instead of 1 - amino-2-hydroxybenzene-5-sulfomethylamino-ethane sulfamide the corresponding sulfomethylamide, sulfodimethylamide, sulfoethylamide, sulfodiethylamide, sulfo-β-hydroxyethylamide, sulfo-di-β-hydroxyethylamide, sulfomethyl - ethylamide, sulfomethyl-β-hydroxy-ethylamide, sulfoethyl-β-hydroxyethylamide are used as diazo components.

We claim:

1. Chrome complex compounds of monoazo dyestuffs free from sulfonic acid groups corresponding to the formula

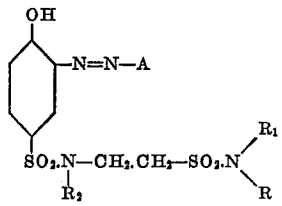

wherein A stands for the radical of a coupling component being coupled in o-position to a hydroxy group, R and $R_1$ stand for members selected from the group consisting of hydrogen, lower alkyl, and lower hydroxy alkyl, and $R_2$ stands for lower alkyl.

2. Chrome complex compounds of monoazo dyestuffs free from sulfonic acid groups corresponding to the formula

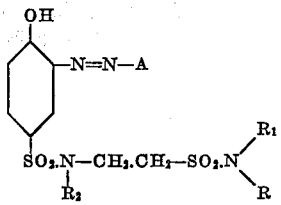

wherein A stands for the radical of a coupling component being coupled in o-position to a hydroxy group, R and $R_1$ stand for members selected from the group consisting of hydrogen, lower alkyl and lower hydroxy alkyl.

3. Chrome complex compounds of monoazo dyestuffs free from sulfonic acid groups corresponding to the formula

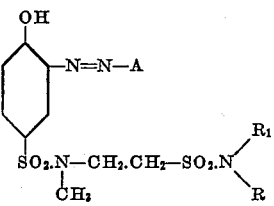

wherein A stands for the radical of a coupling component being coupled in o-position to a hydroxy group, R and $R_1$ stand for members selected from the group consisting of hydrogen, lower alkyl and lower hydroxy alkyl.

4. Chrome complex compound of the monoazo dyestuff corresponding to the formula

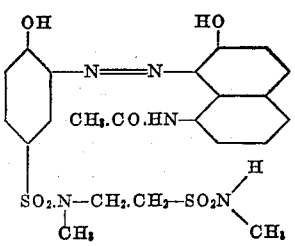

5. Chrome complex compound of the monoazo dyestuff corresponding to the formula
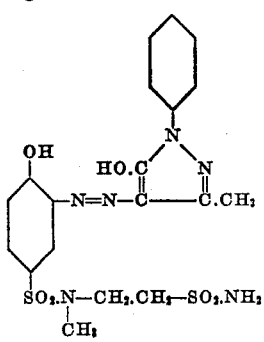
6. Chrome complex compound of the monoazo dyestuff corresponding to the formula
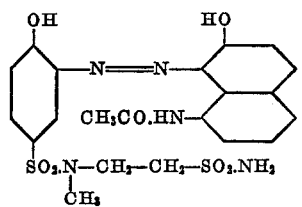
References Cited in the file of this patent
UNITED STATES PATENTS
| | | |
|---|---|---|
| 2,424,493 | Muller et al. | July 22, 1947 |
| 2,518,078 | Schmid et al. | Aug. 8, 1950 |
| 2,597,676 | Schetty | May 20, 1952 |
| 2,606,185 | Widmer et al. | Aug. 5, 1952 |
| 2,610,175 | Widmer et al. | Sept. 9, 1952 |